(12) United States Patent
Chuang et al.

(10) Patent No.: US 7,262,818 B2
(45) Date of Patent: Aug. 28, 2007

(54) VIDEO SYSTEM WITH DE-MOTION-BLUR PROCESSING

(75) Inventors: Chun-Hsiung Chuang, Hsin-Chu (TW); Chien-Hsun Cheng, Taipei (TW); Shih-Sung Wen, Taipei (TW); Chi-Chuan Wang, Taipei (TW)

(73) Assignee: Trumpion Microelectronic Inc., Taipei (TW)

( * ) Notice: Subject to any disclaimer, the term of this patent is extended or adjusted under 35 U.S.C. 154(b) by 621 days.

(21) Appl. No.: 10/749,564

(22) Filed: Jan. 2, 2004

(65) Prior Publication Data

US 2005/0162566 A1    Jul. 28, 2005

(51) Int. Cl.
  *H04N 3/14* (2006.01)
  *G09G 5/39* (2006.01)
  *G06F 13/18* (2006.01)
  *G06K 9/40* (2006.01)

(52) U.S. Cl. ............ 348/790; 345/545; 345/547; 345/611; 382/255; 382/264; 382/275; 348/714; 348/795

(58) Field of Classification Search ........ 348/790–793; 345/531, 535, 545, 547, 611; 382/254, 255, 382/264, 275

See application file for complete search history.

(56) References Cited

U.S. PATENT DOCUMENTS

| | | | |
|---|---|---|---|
| 4,148,071 A | | 4/1979 | Zinchuk |
| 4,876,596 A | | 10/1989 | Faroudja |
| 5,534,934 A | | 7/1996 | Katsumata et al. |
| 5,814,439 A | * | 9/1998 | Ohshima et al. ............ 430/567 |
| 6,067,071 A | | 5/2000 | Kotha et al. |
| 6,157,396 A | * | 12/2000 | Margulis et al. ............ 345/506 |
| 6,177,922 B1 | * | 1/2001 | Schiefer et al. ............ 345/698 |
| 6,456,340 B1 | * | 9/2002 | Margulis ............ 348/745 |
| 6,563,511 B1 | * | 5/2003 | Yeh et al. ............ 345/611 |
| 6,650,792 B1 | * | 11/2003 | Aida et al. ............ 382/298 |
| 6,661,427 B1 | * | 12/2003 | MacInnis et al. ............ 345/660 |
| 6,674,443 B1 | * | 1/2004 | Chowdhuri et al. ............ 345/557 |
| 6,680,752 B1 | * | 1/2004 | Callway et al. ............ 348/448 |
| 7,081,902 B1 | * | 7/2006 | Crow et al. ............ 345/611 |
| 2002/0063807 A1 | * | 5/2002 | Margulis ............ 348/745 |
| 2004/0041918 A1 | * | 3/2004 | Chan et al. ............ 348/222.1 |

OTHER PUBLICATIONS

K. Kawakabe et. al., *New TFT-LCD Driving Method For Improved Moving Picture Quality*, SID 01 Digest, pp. 998-1001.
J. Someya et. al., *Late-News Paper: Reduction of Memory Capacity in Feedforward Driving by Image Comrtepssion*, SID 02 Digest, pp. 72-75.
T. Furuhashi et. al., *Invited Paper: High Quality TFT-LCD System for Moving Picture*, SID 02 Digest, pp. 1284-1287.

* cited by examiner

*Primary Examiner*—Brian P. Yenke
(74) *Attorney, Agent, or Firm*—Bacon & Thomas, PLLC

(57) ABSTRACT

A video system that performs TV signal decoding, deinterlacing, and de-motion-blurring for progressive scan flat panel display is introduced. The system embeds a frame buffer and a scaler for conducting format and resolution conversions for display panels of different sizes. The output of the scaler is sent to a de-motion-blur processor for reducing the blurriness due to the motion of image objects and the slow response time of flat panel display devices. The de-motion-blur processor gets the motion and noise indication signal from scaler or the pre-frame-buffer video processor. Based on the motion and noise information and the information of temporal difference, the de-motion-blur processor performs over driving for the display panel interface and improves the rising and falling response time of the flat panel display. The decoding, deinterlacing, and de-motion-blur processing share the same frame buffer controller so the entire system can be optimized in cost and performance.

20 Claims, 10 Drawing Sheets

VIDEO SYSTEM WITH DE-MOTION-BLUR PROCESSING

BACKGROUND OF THE INVENTION

1. Field of the Invention

The present invention relates to the flat panel TV (especially the LCD TV) display system, and more specifically to a video system for improving the response time and reducing the motion-blur of the panel display.

2. Description of Prior Art

The development of flat panel displays has been accelerated. In the current display market, flat panel displays are gradually replacing the traditional CRT displays. However, some of the flat panel displays, for example, TFT-LCD panel displays, are generally slower in the response time compared to the CRT displays. This disadvantage hampers the development of the LCD TV, for which the display quality (especially motion blur) is highly concerned.

To improve the quality of motion picture on the flat panel (especially TFT-LCDs), various driving techniques have been introduced. Among them, the over driving method is well known as the effective scheme for improving the response time. The over driving method makes the response time fast by applying an over driving voltage to a motion pixel. In order to apply the over driving method to the flat panel, the motion pixels are detected by comparing the pixel values of current and previous frames, and determining the value to be added to the original value. The over driving level is decided through a decision model. Such a model heavily depends on the characteristics of the flat panel. For TFT-LCDs, the decision model is normally implemented by a look-up table built in a over drive circuit chip. The over drive decision requires one-frame delay mechanism for getting the pixel value of the previous frame. A compression and decompression mechanism is used for reducing the bandwidth demands of the frame buffer access for implementing the one-frame delay. The over driving method is proposed in some prior arts to combine with the timing controller (TCON) in the flat panel display for improving the video quality of motion picture.

To further improve the response time of a flat panel display, the present invention proposes an extra video processing for de-motion-blurring. A video system in accordance with the present invention combines the color TV decoding, deinterlacing, scaling, and de-motion-blur process and many other video enhancement features to optimize the overall system in cost.

SUMMARY OF THE INVENTION

An objective of the present invention is to provide a video system, which improves the response time of the flat panel display.

Another objective of the present invention is to provide a video system, which is optimized in cost and performance.

A further objective of the present invention is to provide a de-motion-blur processor, which conditionally disables compression/decompression and over-driving operations so as to provide better quality and rapid image processing.

According to an aspect of the present invention, a video system for flat panel display comprises a pre-frame-buffer processor receiving video signals for decoding and deinterlacing the video signals; a frame buffer controller connected with the pre-frame-buffer processor for providing one or a plurality of field delay to the video signals; a scaler receiving the video signal output from the pre-frame-buffer processor directly or via the frame buffer controller for converting the signals to a desired mode according to the specification of the flat panel display; and a de-motion-blur processor comparing current video signals from the scaler and previous video signals from the frame buffer controller to derive a temporal difference, and controlling over driving to the flat panel display according to the temporal difference.

According to another aspect of the present invention, in the video system, the pre-frame buffer processor provides motion information to the de-motion-blur processor.

According to a further aspect of the present invention, in a video system, a de-motion-blur processor comprises compression and decompression units for compressing and decompressing the video signals; a motion and noise detector receiving motion information, comparing the current and previous video signals, calculating temporal difference value of a certain pixel on the screen; and an over drive processing unit using the temporal difference value of the pixel to determine level of over driving.

BRIEF DESCRIPTION OF THE DRAWINGS

The present invention will be described with reference to the accompanying drawings, wherein.

DETAILED DESCRIPTION OF THE EMBODIMENT

Figure 1:
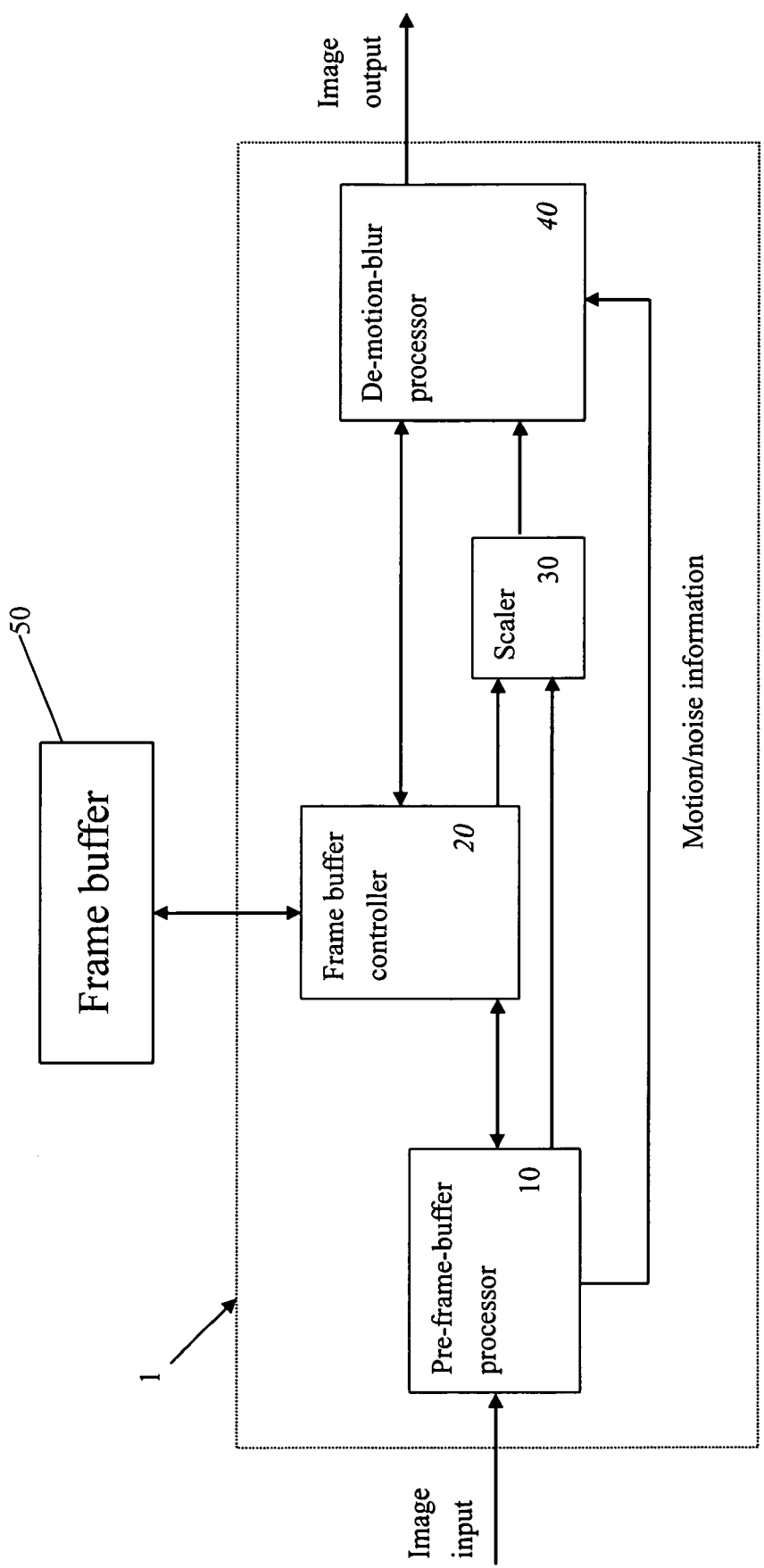
FIG. 1 is a block diagram showing a video system in accordance with the present invention.

The present invention proposes a video system 1 for a flat display device. The video system 1 includes a pre-frame-buffer processor 10, a frame buffer controller 20, a scaler 30, and a de-motion-blur processor 40, as shown in FIG. 1. The flat display device can be (but not limited to) one of TFT-LCD panel, PDP (plasma display panel), OLED (organic light emitting display), and LCOS (liquid crystal on silicon).

In the system, the de-motion-blur processor 40 implements a novel over driving mechanism which uses one-frame or many-frame delay generated through YC-DPCM (Differential Pulse Code Modulation) compression and decompression units 41-43. The de-motion-blur processor 40 further comprises a motion and noise detector 45, and an over drive processing unit 44. The YC-DPCM compression unit performs de-correlation and entropy coding on Y and C (or luminance and chrominance) components separately.

Figure 2:
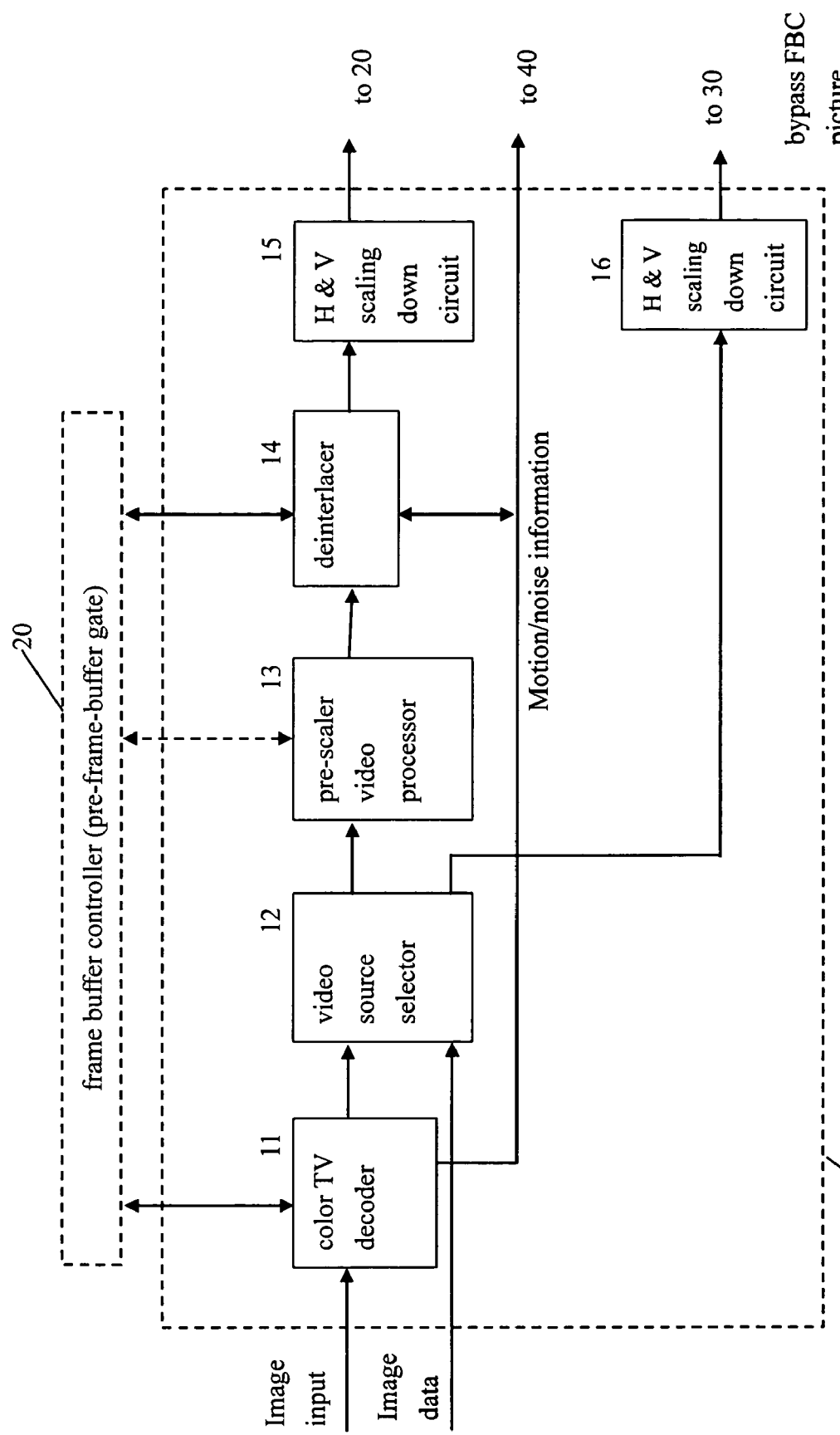
FIG. 2 is a block diagram of pre-frame-buffer processor in the system of FIG. 1.

The pre-frame-buffer processor 10 has the functions of color TV decoding and deinterlacing. As shown in FIG. 2, the pre-frame-buffer processor 10 comprises a color TV decoder 11, a video source selector 12, a pre-scaler video processing unit 13, a deinterlacer 14, H&V scaling-down circuits 15 and 16, and many other video enhancement devices as required.

Signals from one or more video sources are input into the color TV decoder 11. The color TV decoder 11 receives composite video broadcast signal (CVBS) or separated Y/C signals from a TV tuner or set-top-box/DVD player. It may also receive the component (Y/Pb/Pr) video inputs, for which no further color decoding is needed. The composite, separated YC, or component inputs are analog signals with peak-to-peak value of 1V in amplitude, for example. An ADC (Analog to Digital Converter; not shown) converts the analog signals to digital signals for further processing. The color TV decoder 11 slices the horizontal and vertical synchronization signals (hereinafter referred to HS and VS) from the input and uses a PLL (Phase Locked Loop; not shown) to lock the signals to the color carrier frequency. The chrominance signal, comprising U and V for PAL or I and Q for NTSC, is decoded using in-phase and quadrature mixers (not shown) and low-pass filters (not shown). Since the spectra of luminance and chrominance signals are interweaved at the neighboring frequencies of the color carrier, a 3D (three-dimensional) comb filter (not shown) of the color TV decoder 11 is used to separate the luminance and chrominance signals. The comb filter may be adapted for different TV standards (e.g. NTSC, PAL, etc.) A frame buffer 50 as shown in FIG. 1 is used for one- and many-field delay. The color TV decoder 11 has an access to the frame buffer controller 20 controlling the frame buffer 50 so that the frame buffer 50 acts as the temporal delay mechanism for the operation of the 3D comb filter in the color TV decoder 11. The 3D comb filter detects the motion pixels and decides the filter coefficients for separating the interweaved frequency components of the luminance and chrominance signals.

The video source selector 12 receives the video signals output from the color TV decoder 11 at an input port, and receives image data from other sources at a digitized image data port. The video sources selector 12 optionally uses a color space converter (not shown) for RGB to YUV color domain conversion. The video source selector 12 may also switch the input ports to main-picture or sub-picture image paths. Both main-picture and sub-picture are processed separately before being combined in a PIP (picture-in-picture) blending unit 33 of the scaler 30, which will be described later.

The pre-scaler video processing unit 13 receives output from the video source selector 12 for video improvement and color adjustment. The pre-scaler video processing unit 13 may have functions of LTI (Luminance Transient Improvement), CTI (Color Transient Improvement), flesh tone adjustment, and 2D or 3D noise reduction. In the flesh tone adjustment, the colors near the human flesh tone are shifted to a more saturated region, and colors in other ranges are remained unchanged. In the case that 3D noise reduction is implemented, an access to the frame buffer 50 (through the frame buffer controller 20) of the display is necessary for providing one-field or one-frame delay mechanism. This pre-scaler video processing unit 13 provides mainly the subjective color preference adjustment and restores the video quality degraded due to quantization error or channel noise of video compression and transmission. Compared with the adjustment by the video processing unit in the scaler 30 after the deinterlacing, this video adjustment made by the pre-scaler video processor 13 provides the processing for quality improvement of video sources. The video processing in the scaler 30 is more adaptable for quality improvement to panel display.

Receiving output from the pre-scaler video processor 13, the deinterlacer 14 converts the interlacing TV or HDTV signals to a progressively scanned format.

The deinterlacer 14 has an access to the frame buffer controller 20, so that the frame buffer 50 acts as the field delay memory unit for the operation of the deinterlacing. The deinterlacer 14 used a 3-dimensional interpolation filter (not shown), which uses data in the frame buffer 50, to convert the interlaced image into a progressive scanned image.

The deinterlacer 14 checks the temporal and spatial neighboring pixel data of a certain pixel and determines to adopt the motion or still pixel mode operation. In the case of a still pixel mode, a direct pixel merge (even and odd field scan lines are combined to form the progressively scanned frame) is conducted. While in the case of a motion pixel mode, a sophisticated algorithm is used to find the possible motion vector and the intra-frame interpolation is performed accordingly. The deinterlacer 14 also takes into the consideration of the possible conversion from cinema film to TV signals. As known, in so-called 3-2 pull down conversion, it detects the motion pixels, counts the pixels and decides the 3-2-3-2 repetition sequence of the image fields. The 3-2-3-2 repetition sequence, in which 3 frame periods of high state are followed by 2 frame periods of low state and such an arrangement repeats, is introduced due to the 24 (cinema film) to 60 (TV signal) frame-per-second conversion. In film mode, the 3-2-3-2 repetition sequence reveals the facts that 3 consecutive identical pictures are followed by another 2 consecutive identical pictures, and this 3-2-3-2 picture sequence repeats again and again until the so called bad-editing clip is detected. This 3-2-3-2 picture sequence indication is also very important for the de-motion-blur processing. If the film mode is detected, the fact that 3 consecutive identical pictures followed by another 2 consecutive identical pictures means the de-motion-blur processing can be disabled if the two adjacent pictures are exactly the same. Therefore, the finding of this 3-2-3-2 repetition sequence saves the power consumption and reduces the side-effects of de-motion-blur processing.

The pre-frame-buffer video processor 10 may also include scaling down circuits 15 and 16 for horizontal and vertical sample rate down conversion. The horizontal and vertical scaling down circuits provide a decimation of image resolution and pixel data rate. It supports the flat panel display with resolution smaller than the input image or enables the sub-picture display of a PIP (Picture-In-Picture) feature.

The output of this pre-frame-buffer processing 10 is sent to the scaler 30 through the frame buffer controller 20 or sometimes bypassing the frame buffer controller 20.

Although there is the scaler 30 connected with the frame buffer controller 20 (see FIG. 1) in accordance with the present invention, the utilization of the scaling down circuits 15 and 16 in the pre-frame-buffer processing unit 10 has the benefit of lower bandwidth for the frame buffer controller access and easier implementation using input clock ICLK. After the reduction of image resolution, the data amount for each frame can be reduced significantly before the writing to the frame buffer. Besides, with one result per interpolation (per ICLK), this horizontal and vertical scaling down block is easier to be implemented. If a panel clock (PCLK) is used for scaling, there may be two results for one interpolation.

Accordingly, it is advantageous to separate the scaling function into scaling down circuits 15, 16 before the frame buffer controller 20 and the scaler 30 after the frame buffer controller 20. The reason to locate the scaling down circuits after the deinterlacer 14 is explained as follows. The decimation of image resolution can seriously destroy the motion information of an interlaced image. The sophisticated motion vector calculation and film mode detection are no longer valid if the processing order of the deinterlacer 14 and the scaling down circuits 15, 16 is reversed. A vertical scaling down circuit with better display quality can be implemented using some line buffers, but in fact a simple vertical scaling down can be easily realized by proportional line dropping (remove a scan line for every some lines) according to the scaling factor.

Figure 3:
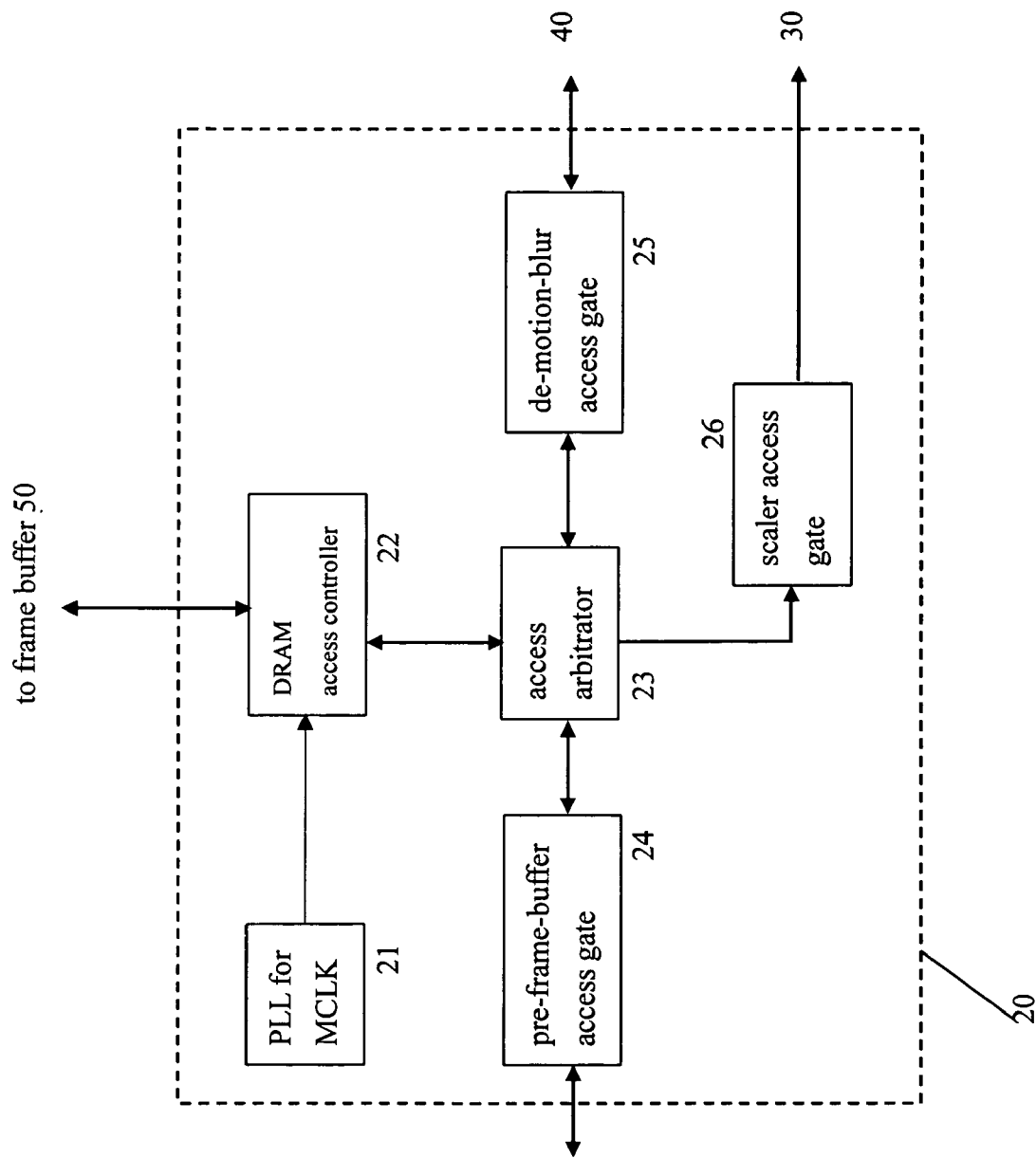
FIG. 3 is a block diagram of a frame buffer controller in the system of FIG. 1.

The frame buffer controller 20, which can be a DRAM controller, is used to provide field or frame delay. As shown in FIG. 3, the frame buffer controller 20 includes a PLL 21 for generating memory access clock signal (MCLK), a DRAM access controller 22, an access arbitrator 23, and three or more access gates connected with the access arbitrator 23. The access gates provide read or write paths so that data can be stored into the frame buffer 50 and restored later.

The frame buffer controller 20 offers the field delay or frame delay for video processing. The access gates include at least a pre-frame-buffer access gate 24, a scaler access gate 25, and a de-motion-blur access gate 26. The pre-frame-buffer access gate 24 offers the field delay or frame delay for color TV decoder, deinterlacer, and in some cases the 3D noise reduction. The scaler access gate 25 fetches the progressive scanned image data and performs further format conversion for fitting the panel resolution. The de-motion-blur access gate 26 is connected to YC-DPCM compression and decompression units of the de-motion-blur processing unit 40. Since the data amount may be dramatically increased after the deinterlacing and scaling up processing, these compression and decompression functions can help to reduce the bandwidth requirement for frame buffer storage. To improve the access efficiency, dual-port SRAM or FIFO (First-In-First-Out) memories (not shown) can be used between the access gates and the access arbitrator for temporary data storage before the burst-write and burst-read of DRAM. These dual-port SRAM or FIFO memories provide also the clock domain isolation, so the meta-stable issue of the interface of different clock frequencies can be avoided. Since at one time only one access gate can get the chance to write or read the frame buffer 50, the access arbitrator 23 acts as a controller for coordination to all access gates. Furthermore, according to the present embodiment, once in some mini-seconds, the bits and bytes stored in the DRAM need at least a read or write operation to maintain the intact content. A refresh access gate (not shown) can be also included in the frame buffer controller but is not discussed in this invention.

Figure 4:
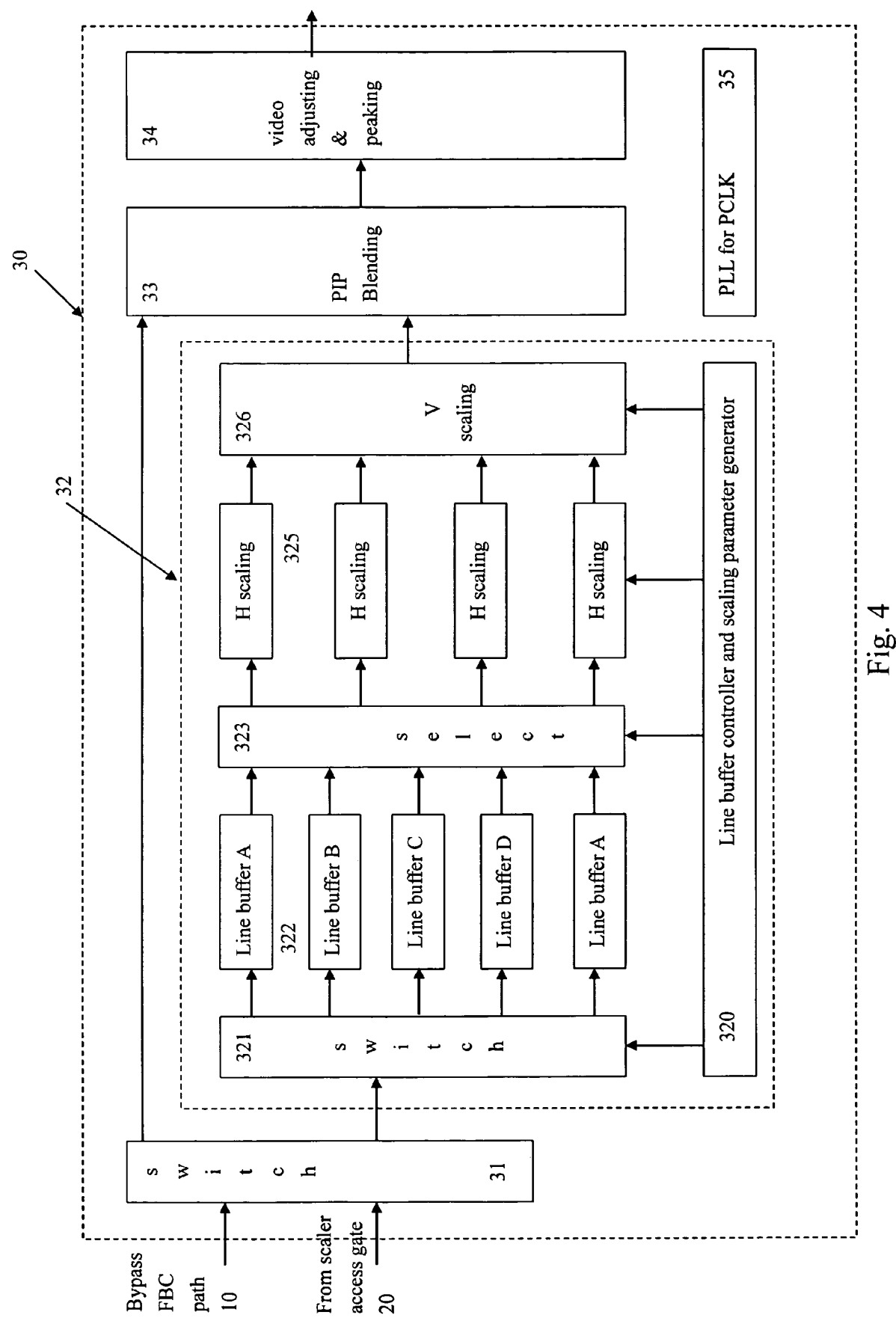
FIG. 4 is a block diagram of a scaler in the system of FIG. 1.

The scaler 30 is used for converting input images to different formats and resolutions for LCD panels of different sizes. The scaler 30 has a main scaling mechanism 32 to perform the horizontal scaling up and vertical scaling up/down to covert resolution for different display panels. A main-picture passes through the main scaling mechanism 32 and then feeds into a PIP (picture-in-picture) blending unit 33, while a sub-picture bypasses the main scaling mechanism 32 and directly fed into the PIP blending unit 33. With reference to FIG. 4, the scaler 30 comprises a PLL 35 for panel clock generation, line buffers 322 and a line buffer controller/scaling parameter generator 320, and the horizontal scaling units 325 followed by a vertical scaling unit 326.

The input image is input to one of the line buffer via a 2-input-2-output switch 31 and a 1-input-5-output switch 321. Then, the image data are read from the line buffers 322 and sent to the horizontal scaling unit 325. The line buffer controller and scaling parameter generator 320 handles the switching and selection of line buffers 322 for writing and reading image data by controlling the switch 321. The line buffer controller 320 also generates address signal and the scaling parameters and sends the parameter setting to the horizontal and vertical scaling units 325, 326. For the case of nonlinear scaling, which is commonly used for 4:3 images to 16:9 wide screen displays, the horizontal scaling factor (and hence the scaling parameters) should be changed for different display zones along the scan line. For keystone correction, the horizontal scaling parameters are different from one to the next scan line. In the embodiment, five line buffers 322 are used and four horizontal scaling units 321 followed by a vertical scaling unit 326.

A PIP (picture-in-picture) blending unit 33 receives the main-picture from the main scaling mechanism 32 and the sub-picture from the switch 31 to combine the pixel data of the main-picture and sub-picture. Since the frame rate of main-picture and sub-picture should be exactly the same, either the main-picture or sub-picture should pass through the frame buffer controller 20 to be adjusted, so that the frame rates of the main-picture and the sub-picture are synchronized. There is a video adjusting and peaking processing unit 34 after the PIP blending unit 33 for brightness, contract, hue, and saturation adjustment. The unit 34 also boosts the middle or high frequency components of the video signal. As mentioned in the previous description, this video processing is more for quality improvement of panel display and hence it heavily depends on the characteristics of display panels.

Figure 5:
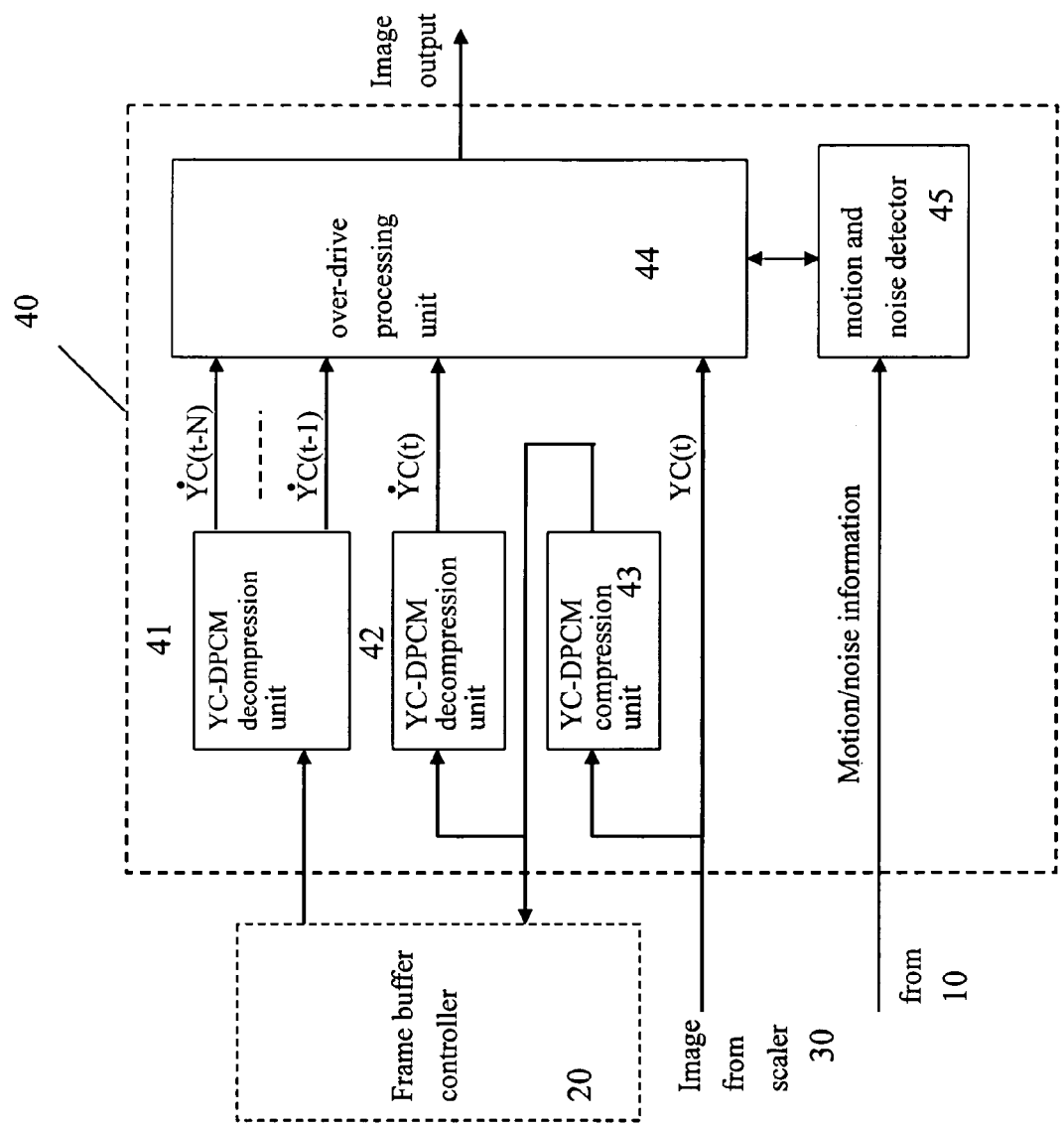
FIG. 5 is a block diagram of a de-motion-blur processor in the system of FIG. 1.

With reference to FIG. 5, the de-motion-blur processor 40 comprises compression and decompression units 41,42, and 43, an over drive processing unit 44, and a motion and noise detector 45. The operation of the over chive processing unit 44 is well known as the driving scheme of improving the response time of a flat panel display. The compression and decompression units 41 to 43 help to reduce the bandwidth requirement of frame buffer access since the amount of image data expanded significantly after the deinterlacing and scaling up. The over drive processing unit 44 uses temporal difference value of a pixel of current and previous images to determine the display data for over driving. This improves the response time but it also increases the noise level in some cases, hence, a motion and noise detector 45 is used to avoid the adverse effect. The motion and noise detector 45 receives motion information from the pre-frame buffer processor and compares current and previous frames to calculate temporal difference value of a certain pixel using signals from YC-DPCM compression/decompression units 41 and 42. It also calculates spatial difference between a pixel and its neighboring pixels and controls the over driving of the over drive processing unit 44 according to the motion information and the spatial and temporal difference values. The motion information from the pre-frame-buffer processor includes at least a motion/noise indication signal and a film mode indication signal, such as a still picture indication signal (e.g. 3-2-3-2 repetition signal for NTSC TV system or 2-2-2-2 repetition signal for PAL TV system). The over driving level of the over drive processing unit 44 is decennined for the display device according to the spatial and temporal difference value and the motion information of the pixel. A look-up table is used for mapping the difference values to the over driving level. In the over drive processing unit 44, it is determined to directly use the compressed-decompressed image or the image from the scaler 30 bypassing the compression and decompression units (in a word, the over drive processing unit 44 is disabled), if the motion information indicates that the picture is in the still mode.

As mentioned above, the motion and noise detector 45 calculates the difference of image values of the pixels on some consecutive frames. This motion and noise detector 45 also gets motion information, such as the motion and noise indication, from the color TV decoder 11, deinterlacer 14, and scaler 30, In order to reduce the complexity of implementation, we use the YC-DPCM scheme for the image compression/decompression before and after the storage to the frame buffer 50. An image is decomposed into the Y and C (or luminance and chrominance) components. The DPCM method then applies to Y and C compression and decompression units simultaneously. The aforementioned frame buffer controller 20 (see FIG. 3) not only provides the field delay mechanism to the pre-frame-buffer processor 10, it also offers one or a plurality of frames of temporal delay to the de-motion-blur processor 40 for generating the temporal difference in over driving calculation. The motion and noise detector 45 calculates difference from the current frame image YC(t), the one-frame delayed image YC(t−1), and up to the N-frame delayed image YC(t−N), so as to control the over drive processing unit 44.

As mentioned above, for image compression, several characteristics are desirable in a method used. An ideal method completely de-correlates the image data before quantization and coding. Some commonly used image compression methods such as JPEG or MPEG, use DCT (Discrete Cosine Transform), are expensive in cost of implementation.

In the embodiment in accordance with the present invention, YC-DPCM method is used. The method uses a scheme in which the prediction is subtracted from the actual pixel value to obtain a differential image, which is much less correlated than the original image data. The differential image is then quantized and encoded.

Figure 6:
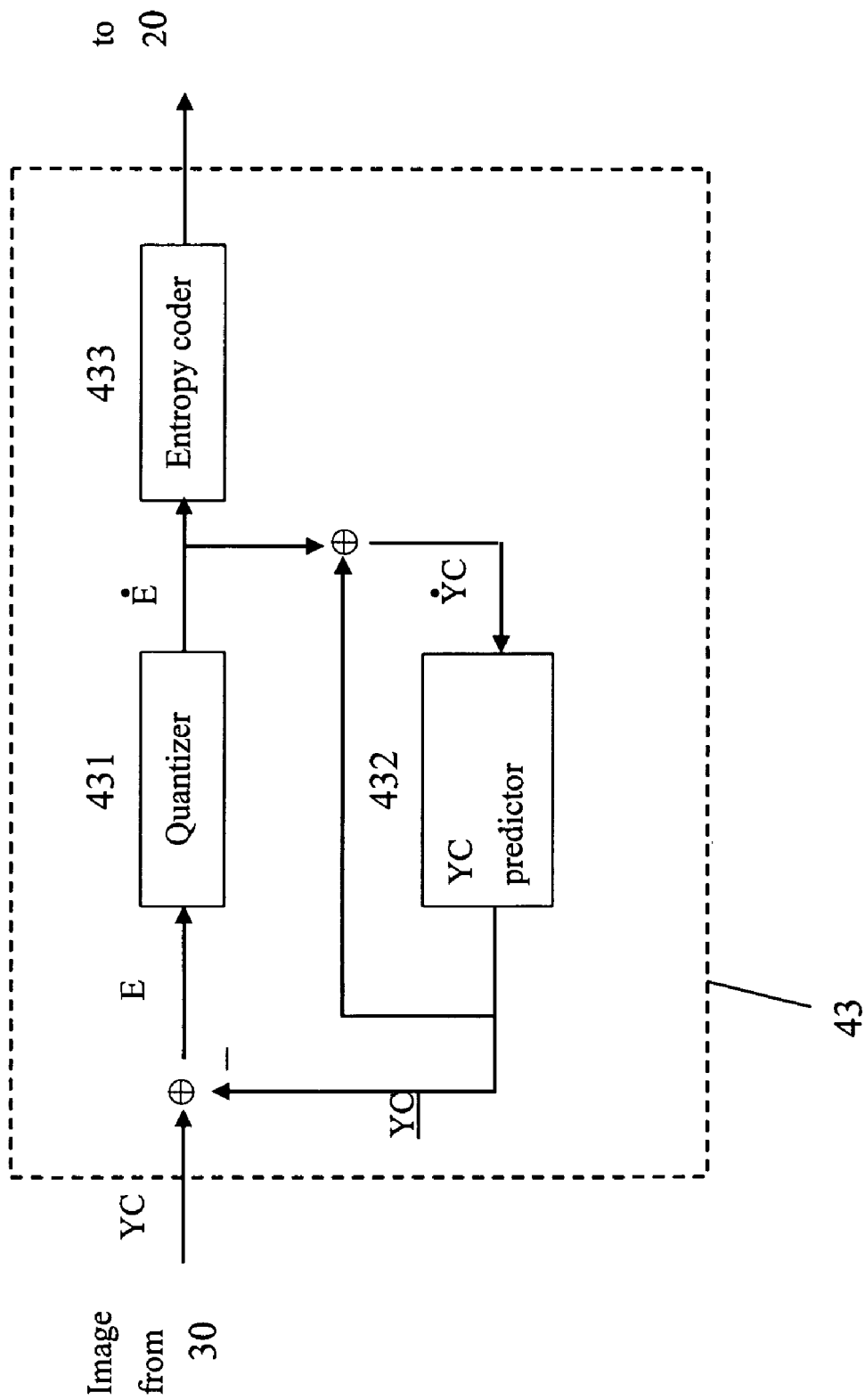
FIG. 6 is a block diagram of the YC-DPCM compression unit in the de-motion-blur processor of FIG. 5.

FIG. 6 schematically depicts the YC-DPCM compression unit 43. The YC-DPCM compressor 43 comprises a quantizer 431, an entropy coder 433 and a YC predictor 432. The difference between the actual pixel value YC(t) and the most likely predicted value $\underline{YC}(t)$ from the predictor 432 is calculated and referred to the differential signal or error signal E(t). That is, $$E(t) = YC(t) - \underline{YC}(t) \qquad (1)$$

We also define Ė(t) as the quantized error signal output from the quantizer 431. Using the entropy coder 433, this quantized error signal Ė(t) is coded before being sent to the frame buffer 50. The predictor 432 can be a liner predictor. In general, linear predictor is not the optimal choice as compared to the predictor maximizing the conditional probability using Markov model. However, in most cases, this small loss due to the use of the linear predictor in performance can be compensated for by the significant reduction in computation complexity.

Figure 7:
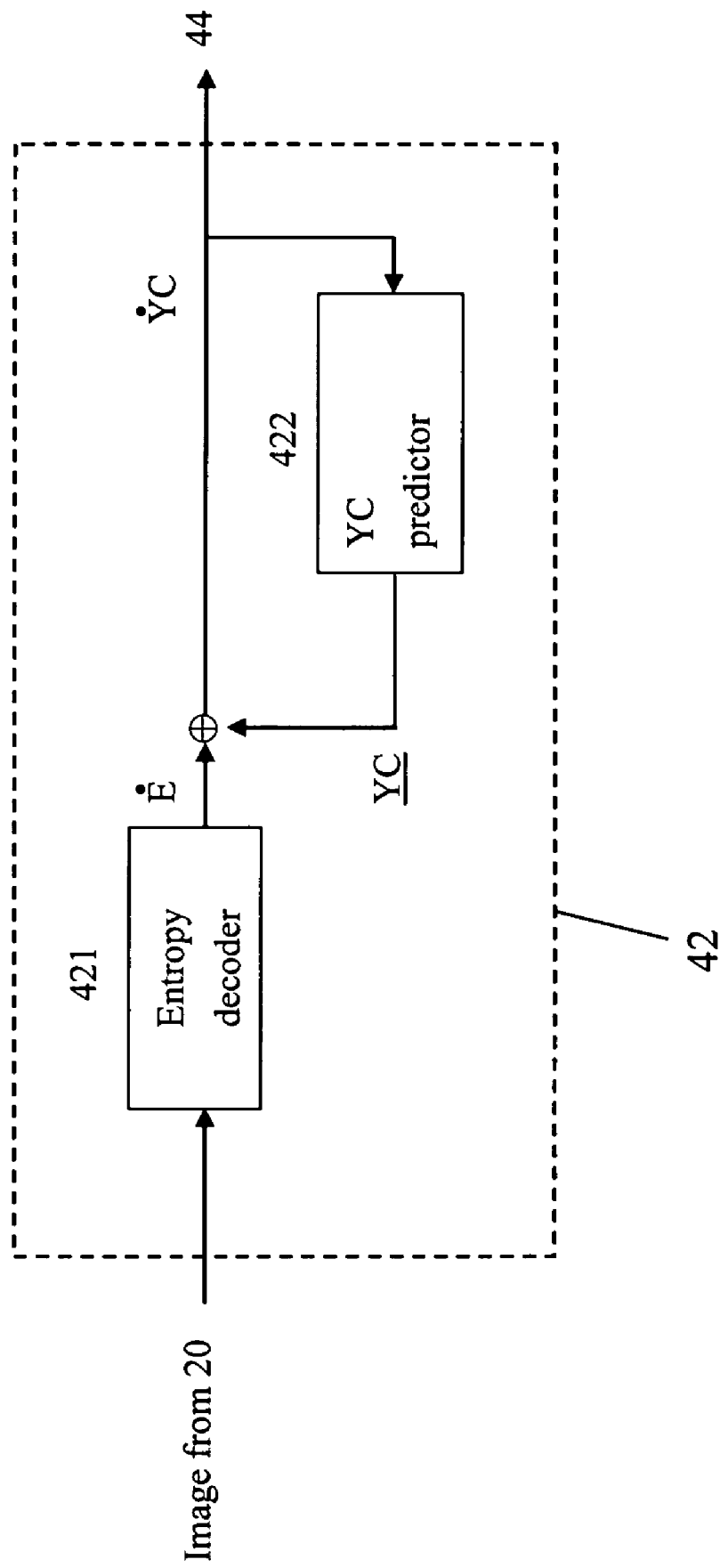
FIG. 7 is a block diagram of the YC-DPCM decompression unit in the de-motion-blur processor of FIG. 5.

FIG. 7 illustrates the block diagram of the YC-DPCM de-compressor 42, which comprises an entropy decoder 421 and a YC predictor 422. The reconstructed pixel YĊ(t) is given by:

$$Y\dot{C}(t) = \underline{YC}(t) + \dot{E}(t) \qquad (2)$$

Note that we observe that the prediction at this de-compressor block based on reconstructed values of the fetched data from frame buffer 50. In order to prevent error generated at the de-compression side, the prediction in both compressor and de-compressor blocks must be identical. Therefore, the predictor in the compressor 43 also uses the reconstructed values of the previously encoded samples in the prediction instead of their actual values. For this, the compression simulates the decoder in the prediction loop, as shown in the FIG. 6.

Figure 8:
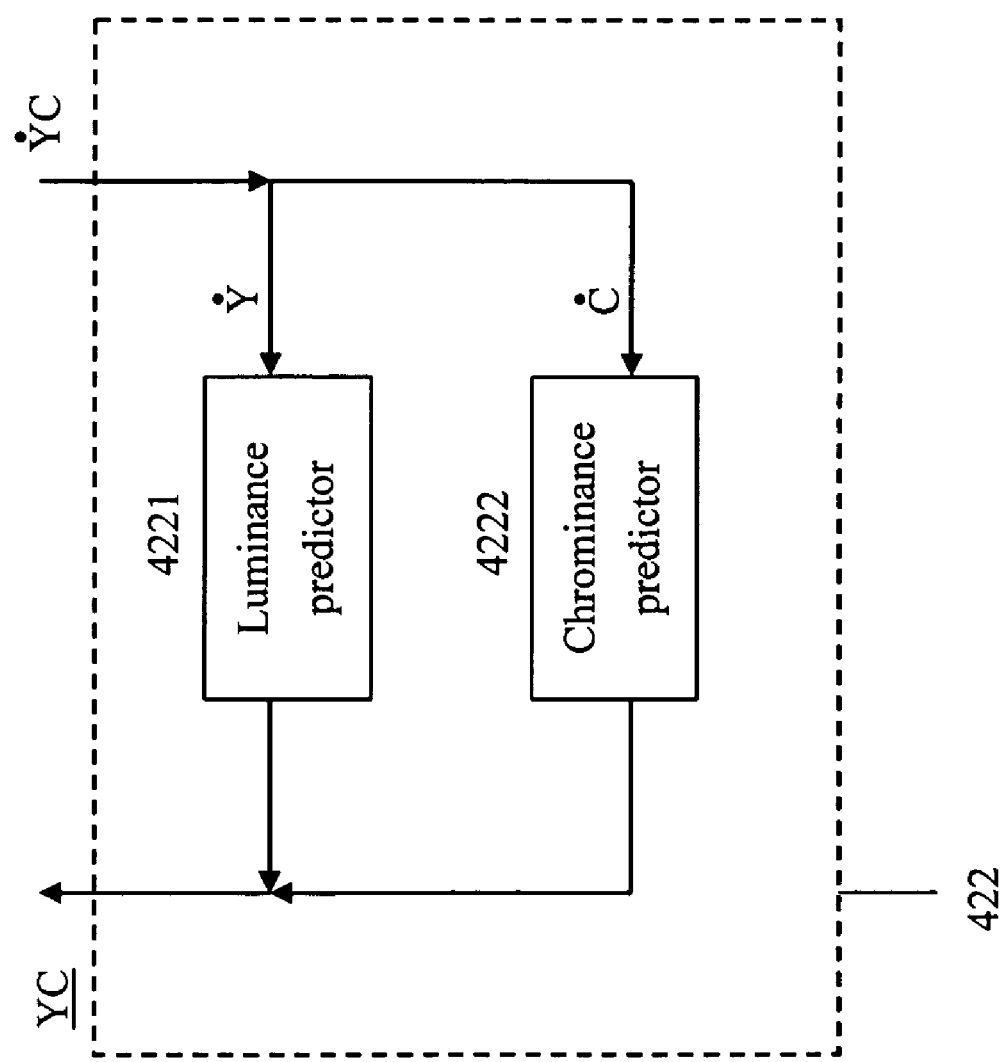
FIG. 8 is a block diagram of a YC predictor in the YC-DPCM compression unit of FIG. 6 or the decompression unit of FIG. 7.

FIG. 8 shows an embodiment of the predictor 422. For practical application, the Y and C predictors can be implemented with a simple circuit that calculates the linear combination of the neighboring pixels. In this drawing, the YC predictor comprises a luminance predictor 4221 and a chrominance predictor 4222. A pixel is decomposed into luminance and chrominance components, denoted as Y and C respectively. Due to the different visual sensitivity to human eyes, the luminance and chrominance prediction are implemented separately. The luminance and chrominance predictors 4221 and 4222 are designed and characterized according to the response time of display devices and visual response of human eyes. In fact, since the response time of the color information is less critical than the gray-level information, we can use linear predictors of different orders for luminance and chrominance processing. For example, the second-order chrominance predictor:

$$X_C = 0.5 * A_C + 0.5 * C_C, \qquad (3)$$

Figure 9:
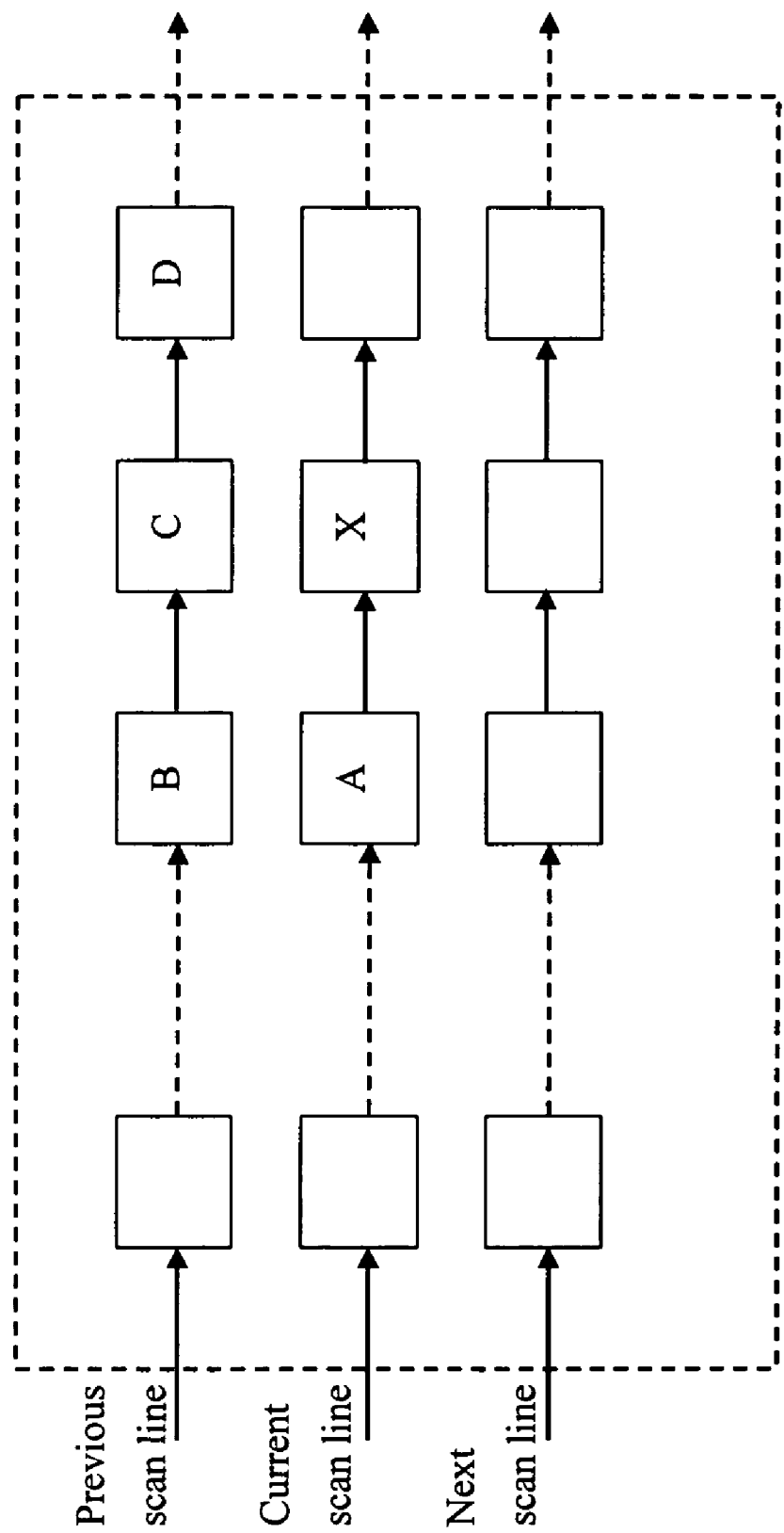
FIG. 9 shows the neighboring pixels for a linear predictor.
Figure 10:
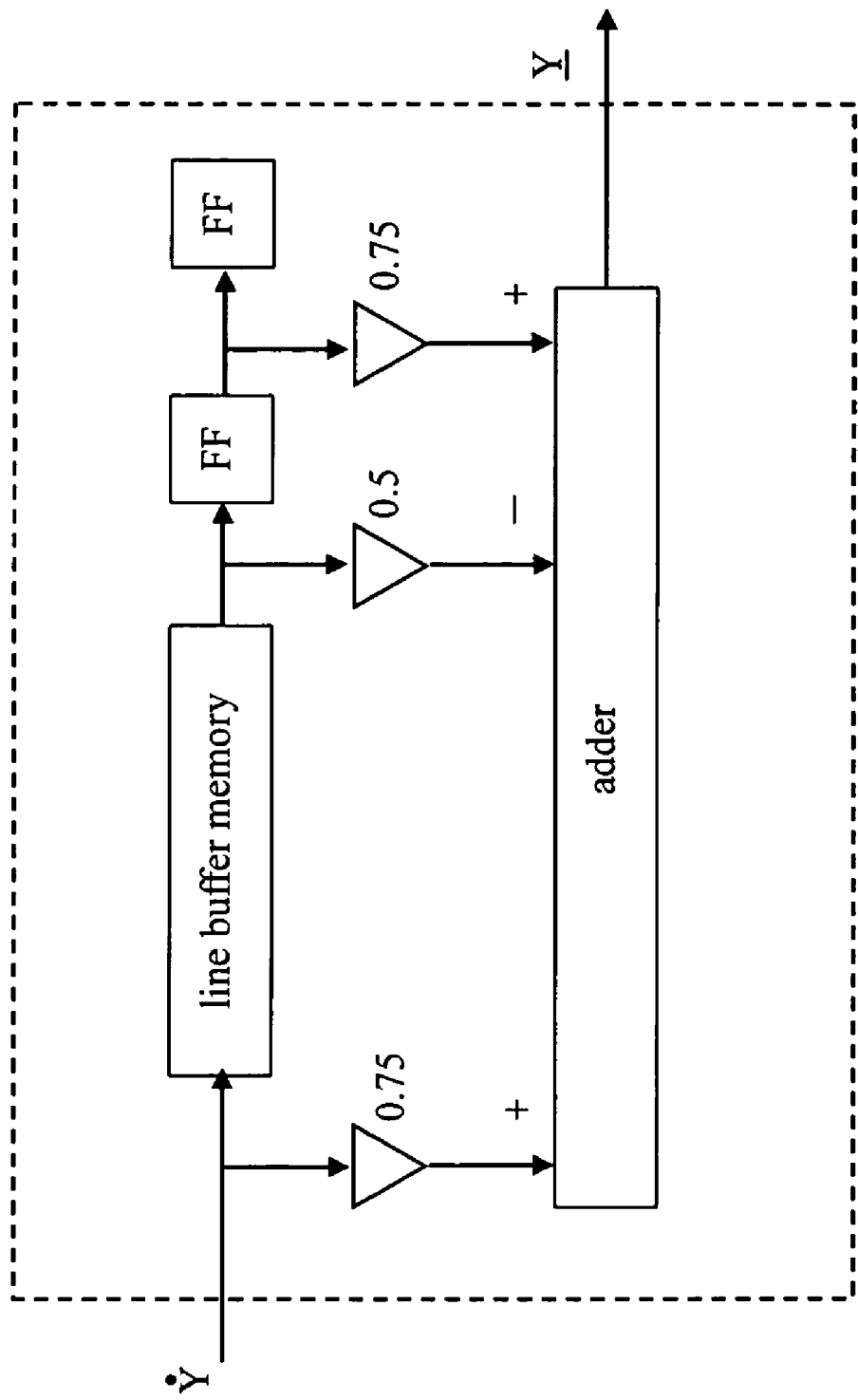
FIG. 10 shows an embodiment of the Y (luminance) linear predictor used in the YC-DPCM compression or decompression unit.

And the third-order luminance predictor:

$$X_Y = 0.75 * A_Y - 0.5 * B_Y + 0.75 * C_Y, \qquad (4)$$

Where X is the pixel to be predicted, and A, B, and C indicate the neighboring pixels on the current and previous scan lines used for prediction (see FIG. 9). Subscripts Y and C respectively denote the luminance and chrominance components of a pixel data. A third-order luminance predictor is depicted in FIG. 10 as an example. The circuit can be easily extended to a linear predictor of other orders.

Note that in FIG. 5, there are some input image data buses fed into the over drive processing unit 44 for the over driving processing. The input image buses are current frame data YC(t), restored (compressed and then decompressed) current frame data YĊ(t), and restored previous frame data YĊ(t−1), ..., and YĊ(t−N). The output of the over driving processing is obtained by the following equation:

$$YC^{out}(t) = YC(t) + OD^{Table}(Y\dot{C}(t), Y\dot{C}(t-1), \ldots, Y\dot{C}(t-N)), \qquad (5)$$

where the second term $OD^{Table}$ 0 is the acceleration value. For the special case that N=1, the function $OD^{Table}$ is the look-up table that depends on the amplitude of YĊ(t) and the difference between YĊ(t) and YĊ(t−1). The acceleration value (also called over driving value) is zero if restored current and restored previous frame data are substantially equal. In a word, if the image is a still image, the output data $YC^{out}(t)$ will be exactly the current frame image YC(t). Hence, the distortion due to compression and decompression can be totally removed and the quality of still images will not be degraded. On the other hand, if a pixel is detected as the motion pixel, through the look-up table, an over driving value is determined and added to the current frame image. For practical application, the look-up table used in the present invention can be implemented by a table, which has 6-bit resolution for luminance and 4-bit resolution for chrominance. For each input and output voltage value, the content of the over-drive table should be derived from the response time characteristics for a particular display device.

The over driving process used to improve the response time could lead to noise amplification if the input image is noisy. In accordance with the present invention, the motion detection circuit 45 is used to adaptively adjust the threshold for determining the image state is motion or still. Noise information such as noise level can be collected from the image data during the vertical retrace period (supposed to be black pixels) and be derived from the 3D noise reduction function. During the pre-frame-buffer processing, the video decoder 11 and deinterlacer 14 need to determine the status of a pixel is motion or still. Based on this information, a motion and noise indication signal is generated and then forwarded to the motion and noise detector 45.

As mentioned above, if the film mode is detected in the deinterlacer 14, the 3-2-3-2 repetition sequence signal for NSTC system (or 2-2-2-2 for PAL) designates 3 identical pictures followed by another 2 consecutive identical pictures. The de-motion-blur processor 40 gets the indication at every frame and determines to disable the over driving processing of the over drive processing unit 44 if the two adjacent pictures are exactly the same (no motion pixels at all and hence the over driving values are always zero for the entire frame). With this (3-2-3-2 for NTSC and 2-2-2-2 for PAL) repetition sequence indication, the over driving processing saves (⅗ for NTSC and or ½ for PAL) the total power consumption and reduce the unfavorable side effect.

The present invention discloses a video system that performs color TV decoding, deinterlacing, format and resolution conversion, and de-motion-blur processing. In the system of the present invention, the motion pixel detection at earlier processing stages can be forward passed to the later stage. Furthermore, the frame buffer controller 20 provides the frame delay mechanism for over drive processing of the motion-blur processor 40, and also for 3D comb filter in color TV decoder 11 and the deinterlacer 14 of the pre-frame-buffer processor 10. This saves the computation, the storage space, and the frame buffer access bandwidth. By sharing the frame-buffer controller 20 and forward-passing the motion and noise information, this invention minimizes the overall system cost and improves the display quality.

While the embodiment of the present invention as illustrated and described, various modifications and alterations can be made by persons skilled in this art. The embodiment of the present invention is therefore described in an illustrative but not restrictive sense. It is intended that the present invention may not be limited to the particular forms as illustrated, and that all modifications and alterations which maintain the spirit and realm of the present invention are within the scope as defined in the appended claims.

What is claimed is:

1. A video system for flat panel display having a frame buffer comprising:
   a pre-frame-buffer processor receiving video signals, decoding and deinterlacing the video signals, and providing motion information;
   a frame buffer controller for providing one or a plurality of field delay to the video signals output from the pre-frame-buffer processor;
   a scaler receiving the video signals output from the pre-frame-buffer processor directly or from the frame buffer controller, and converting sample rate of the signals according to the feature of the flat panel display, and
   a de-motion-blur processor receiving the video signals from the frame buffer controller and scaler, receiving the motion information from the pre-frame-buffer processor, comparing current video signals and previous video signals from the frame buffer controller to obtain a temporal difference, and performing over driving for the flat panel display according to the motion information and the temporal difference.

2. The system as claimed in claim 1, wherein the motion information comprises at least a motion and noise indication signal.

3. The system as claimed in claim 1, wherein the motion information comprises at least a film mode indication signal, which is used to enable or disable the over driving.

4. The system as claimed in claim 1, wherein said pre-frame buffer processor comprises a color TV decoder for decoding the video signals and providing motion information to the de-motion-blur processor.

5. The system as claimed in claim 4, wherein said color TV decoder has an access to the frame buffer controller providing one or a plurality of field delays for the operation of the color TV decoder.

6. The system as claimed in claim 1, wherein said pre-frame buffer processor comprises a video source selector for selecting the source of the video signal.

7. The system as claimed in claim 1, wherein said pre-frame buffer processor comprises a pre-scaler video processing unit for performing at least one of features of color transient improvement, luminance transient improvement, noise reduction, and flesh tone adjustment.

8. The system as claimed in claim 1, wherein said pre-frame buffer processor has an access to the frame buffer controller providing field delay for noise reduction.

9. The system as claimed in claim 1, wherein said pre-frame buffer processor comprises a deintertacer for performing deinterlacing to convert the interlaced video signals to progressive scanned video signals.

10. The system as claimed in claim 9, wherein said deinterlacer has an access to the frame buffer controller providing field delay for deinterlacing.

11. The system as claimed in claim 9, wherein said deinterlacer provides motion information to the de-motion-blur processor.

12. The system as claimed in claim 1, wherein said pre-frame buffer processor comprises horizontal and vertical scaling down circuits for pixel rate decimating.

13. The system as claimed in claim 1, wherein said frame buffer controller comprises a first gate providing an access to the pre-frame-buffer processor and a second gate for providing an access to the scaler and a third gate for providing art access to the de-motion-blur processor, and further comprises an access arbitrator for controlling the gates so that only one gate can write or road data to or from the frame buffer at a time.

14. The system as claimed in claim 1, wherein said scaler comprises a main scaling mechanism for converting sample rate for different display resolutions.

15. The system as claimed in claim 14, wherein said scaler further comprises a PIP (picture-in-picture) blending unit for combining signals passing the main scaling mechanism and signals bypassing the main scaling mechanism.

16. The system as claimed in claim 1, wherein the de-motion-blur processor comprises compression and decompression units for compressing and decompressing the video signals.

17. The system as claimed in claim 16, wherein the compression and decompression units using differential PCM to separately process luminance and chrominance components of the video signals.

18. The system as claimed in claim 1, wherein the de-motion-blur processor comprises an over drive processing unit for performing over driving for the flat panel display; and a motion noise detector comparing the current and previous video signals, calculating temporal difference value of a pixel of the video signals and determining over driving level of the over drive processing unit according to the difference value.

19. The system as claimed in claim 18, wherein the motion and noise detector further receives motion information from the pre-frame-buffer processor and generates a control signal for controlling the over driving level of the over drive processing unit.

20. The system as claimed in claim 18, wherein the motion and noise detector disables the over drive processing unit if the difference value indicates a still mode.

* * * * *